(12) United States Patent
Nan et al.

(10) Patent No.: US 12,308,740 B2
(45) Date of Patent: May 20, 2025

(54) PREDICTIVE LOAD TRANSIENT BASED VOLTAGE REGULATOR TURBO FOR VOLTAGE DROOP MINIMIZATION

(71) Applicant: Google LLC, Mountain View, CA (US)

(72) Inventors: Chenhao Nan, Santa Clara, CA (US); Qiong Wang, Palo Alto, CA (US); Kaushik Vaidyanathan, Santa Clara, CA (US); Houle Gan, Santa Clara, CA (US); Xin Li, Cupertino, CA (US)

(73) Assignee: Google LLC, Mountain View, CA (US)

( * ) Notice: Subject to any disclaimer, the term of this patent is extended or adjusted under 35 U.S.C. 154(b) by 379 days.

(21) Appl. No.: 17/712,648

(22) Filed: Apr. 4, 2022

(65) Prior Publication Data

US 2023/0318456 A1 Oct. 5, 2023

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05)

(58) Field of Classification Search
CPC .................... H02M 3/158; H02M 1/0009
See application file for complete search history.

(56) References Cited

U.S. PATENT DOCUMENTS

| 7,212,110 | B1* | 5/2007 | Martin | A61N 1/3727 607/34 |
| 7,441,137 | B1* | 10/2008 | Mimberg | G05F 1/462 713/340 |
| 8,736,243 | B2 | 5/2014 | Gizara | |
| 8,816,757 | B1* | 8/2014 | Yabbo | H02M 3/06 327/540 |
| 9,037,883 | B2 | 5/2015 | Huang et al. | |
| 2007/0001653 | A1* | 1/2007 | Xu | H02M 3/1584 323/225 |
| 2021/0286419 | A1* | 9/2021 | Gan | G06N 20/00 |
| 2022/0109368 | A1* | 4/2022 | Zhou | H02M 3/1586 |

FOREIGN PATENT DOCUMENTS

EP    3879383 A1    9/2021

OTHER PUBLICATIONS

Extended European Search Report for European Patent Applicatio No. 22207749.7 dated Sep. 14, 2023. 10 pages.

* cited by examiner

*Primary Examiner* — Jue Zhang
*Assistant Examiner* — Lakaisha Jackson
(74) *Attorney, Agent, or Firm* — Lerner David LLP

(57) ABSTRACT

Controlling voltage supplied to a load includes predicting a load current transient, generating a turbo signal in response to predicting the load current transient, and increasing, in response to the turbo signal, responsiveness of a voltage regulator supplying voltage to the load.

19 Claims, 7 Drawing Sheets

PREDICTIVE LOAD TRANSIENT BASED VOLTAGE REGULATOR TURBO FOR VOLTAGE DROOP MINIMIZATION

BACKGROUND

There is a trend toward higher current demand by electronic processors. For instance, there is a trend toward ultra-high current demand by application-specific integrated circuits (ASICs) and graphics processing units (GPUs) employed in data centers for artificial intelligence (AI) and/or machine learning (ML) applications. The current demand in such ASICs/GPUs may be greater than 1000 A. Moreover, the rate at which the current demanded by electronic processors changes has also increased. For example, an ASIC/GPU load current transient for AI/ML applications can exhibit slew rates of greater than 5000 A/us. These large current transients pose a big challenge for the power delivery network (PDN) that supplies the ASICs/GPUs, and in particular, for a voltage regulator (VR) that supplies an ASIC/GPU, the large current transients often leading to a large undershoot/overshoot of the voltage supplied to the ASIC/GPU.

For a VR to meet large load transient requirements of a processor while avoiding large swings in output voltage, the response speed of the VR must be commensurate with the transient. For a switching voltage regulator, fast response speed usually requires the VR to run at a high switching frequency, which reduces the VR operation efficiency and impacts the VR's thermal performance as well. Various VR control methods have been proposed to reduce the output voltage undershoot/overshoot caused by load transients, but all of those methods are based on reacting to detecting a difference between the desired VR output voltage and an actual output voltage. That is, various VR control methods are operated in a way that reacts to a load transient after the transient has begun.

BRIEF SUMMARY

It has been recognized that VR control methods implemented by reacting to a load transient after the transient has begun are limited in their ability to minimize the VR voltage undershoot/overshoot associated with the load transient. It has been further recognized that the VR undershoot/overshoot associated with a load transient can be reduced by predicting the occurrence of the load transient and increasing responsiveness of the VR before occurrence of the transient. Still further, it has been recognized that certain AI/ML ASICs/GPUs have a very long instruction pipeline and sequenced or in-order instruction execution, unlike the relatively short pipeline and out-of-order instruction execution in other types of processors running AI/ML workloads, such as central processing units (CPUs) running AI/ML workloads; and that for such AI/ML ASICs/GPUs, predicting large current transients is easier and can be performed further in advance than in the case of CPUs running AI/ML workloads (e.g., tens of nanoseconds earlier), thereby facilitating increasing the responsiveness of a VR confronted with a large transient.

In view of the desire to minimize the voltage undershoot/overshoot associated with VRs experiencing large load transients, and the ability to readily predict large load transients in certain applications, the presently disclosed technology is provided.

In accordance with the presently disclosed technology a mechanism that boosts VR response based on predictive load information from a processor to minimize the output voltage undershoot/overshoot during a load transient. When there is no load transient, the VR can operate in an efficiency optimized mode.

In one aspect, the technology provides a method for controlling voltage supplied to a load including predicting a large load current transient; generating a turbo signal in response to predicting the large load current transient; and increasing, in response to the turbo signal, responsiveness of a voltage regulator supplying voltage to the load.

In another aspect, the technology provides a processing system including a processor operable to predict a current transient for the current supplying the processor and generate a turbo signal when the current transient is predicted; and a voltage regulator operable to supply voltage to the processor and to increase, in response to the turbo signal, responsiveness of the voltage regulator.

BRIEF DESCRIPTION OF THE DRAWINGS

The accompanying drawings are not intended to be drawn to scale. Also, for purposes of clarity not every component may be labeled in every drawing. In the drawings.

DETAILED DESCRIPTION

Examples of systems and methods are described herein. It should be understood that the words "example," "exemplary" and "illustrative" are used herein to mean "serving as an example, instance, or illustration." Any embodiment or feature described herein as being an "example," "exemplary" or "illustration" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
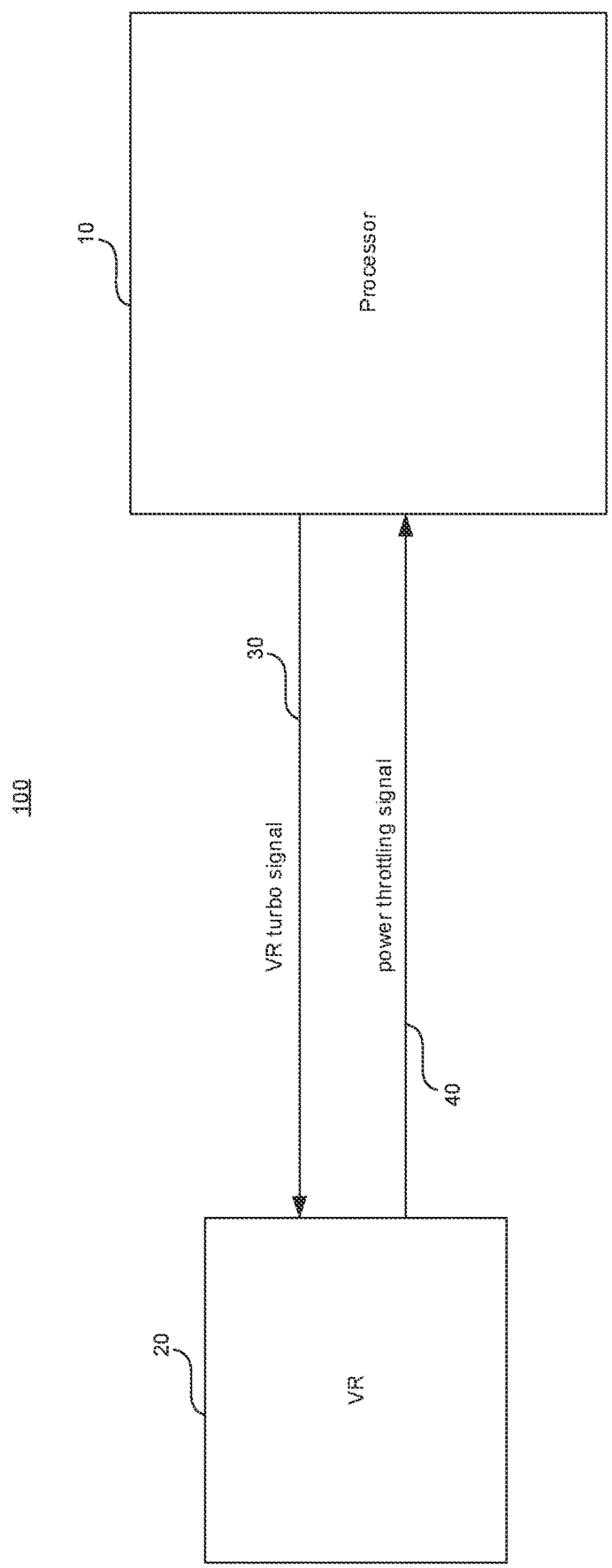
FIG. 1 is a block diagram of processor and a voltage regulator of an embodiment.

FIG. 1 is block diagram of processor 10 and a voltage regulator 20 of an embodiment. The processor 10 and voltage regulator 20 may be considered a system 100, although they may also be considered as parts of separate systems. Moreover, the processor 10 and voltage regulator may be distinct units or may be integrated into a single unit.

In any event, FIG. 1 describes a basic scheme of a VR turbo mechanism for minimizing output voltage undershoot/overshoot. In this scheme, there are two key signals between the processor 10 and the VR 20, a turbo signal 30 (or "VR turbo signal" 30) from the processor 10 to the VR 20, and a power throttling signal 40 from the VR 20 to processor 10. Further, in some embodiments the processor 10 is an ASIC or a GPU (hereinafter ASIC/GPU) and the VR 20 is a switching voltage regulator, and therefore the VR turbo signal 30 may be sent from an ASIC/GPU 10 to a switching VR 20, and the power throttling signal 40 may be sent from the switching VR 20 to the ASIC/GPU 10. In other embodiments the processor 10 is an ASIC/GPU and the VR 20 is a low-drop-out (LDO) voltage regulator, and therefore the VR turbo signal 30 may be sent from an ASIC/GPU 10 to an LDO VR 20, and the power throttling signal 40 may be sent from the LDO VR 20 to the ASIC/GPU 10. For purposes of concise explanation, this disclosure is provided largely in the context of a switching voltage regulator, although in light of the disclosure one skilled in the art can readily apply the disclosed technology to LDO regulators, even though the detailed technology for increasing the responsiveness of an LDO regulator is different from the detailed technology for increasing the responsiveness of a switching voltage regulator. Further, it should be noted that the VR 20 may be a trans-inductor voltage regulator (TLVR) or a standard single phase or multiphase magnetic coupled or non-coupled switching regulator.

The VR turbo signal 30 goes to an active level to signal an upcoming large load current transient. That is, the VR turbo signal 30 goes to an active level to signal an upcoming large current transient at the processor 10. For example, the VR turbo signal 30 is driven to a high level by the ASIC/GPU 10 to the VR 20, and if the VR 20 and ASIC/GPU are integrated into a single chip or package, the VR turbo signal 30 is driven within the chip/package. In some embodiments, the VR turbo signal 30 may be generated tens of ns, or even longer, before the beginning of a corresponding large current transient. The large current transient detected inside the ASIC/GPU could be either a step-up or step-down current transient. Once the VR 20 receives the turbo signal 30, the VR 20 will enter into a VR turbo mode which has boosted transient response capability, and/or different VR switching states which enable the VR to start pumping/sinking more energy to/from the ASIC/GPU upon receiving the VR turbo signal, so that the output undershoot/overshoot of the VR 20 can be minimized when the load transient actually occurs tens of ns later. The VR 20 stays in the turbo mode until the VR turbo signal 30 goes to an inactive level, e.g., is driven to a low level by the ASIC/GPU 10.

Figure 2:
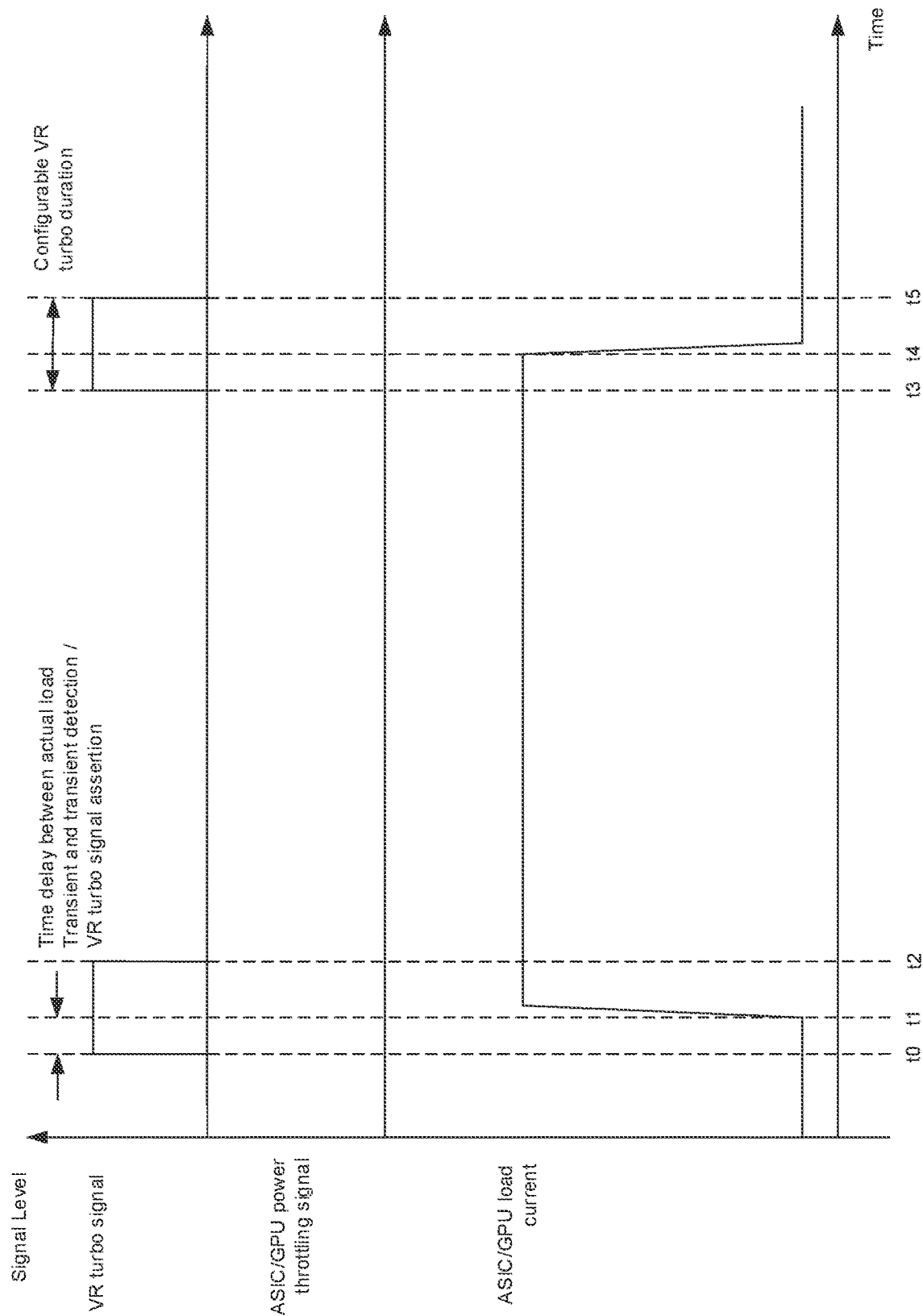
FIG. 2 is a timing diagram showing an illustrative timing relationship between a turbo signal and a power throttling signal, and the current supplied to a processor, in which the power throttling signal is not activated.

Turning now to FIG. 2, the figure is a timing diagram showing an illustrative timing relationship between a turbo signal and a power throttling signal, and the current supplied to a processor, in which the power throttling signal is not activated. The timing diagram is applicable to the processor 10 (e.g., an ASIC/GPU), VR 20 and VR turbo signal 30 of FIG. 1. As can be seen from FIG. 2, the figure illustrates the VR turbo signal 30 for load step-up and load step-down transient scenarios, respectively when moving toward the right on the time axis. At time t0, an upcoming large load step-up transient is predicted by the ASIC/GPU 10 and then a VR turbo signal 30 is quickly asserted. Before time t1, at which time the actual step-up load transient starts ramping up, but after detecting the assertion of the VR turbo signal 30, the VR 20 begins working in turbo mode. Therefore, the voltage droop due to this transient is minimized by the boosted VR transient capability and/or by energy delivered by the VR ahead of the actual load transient. At time t2, the VR turbo signal 30 is de-asserted after a configured duration and, accordingly, the VR 20 will exit from the turbo mode. Similarly, at t3, an upcoming large load step-down transient is predicted by the ASIC/GPU and a VR turbo signal 30 is again asserted. Before time t4, at which time the actual step-down load transient starts ramping down, but after detecting the assertion of the VR turbo signal 30, the VR 20 again begins working in turbo mode. Therefore, the voltage overshoot due to the large step-down transient is minimized by the boosted VR transient capability, and/or by the VR absorbing energy ahead of the actual load transient. At time t5, the VR turbo signal 30 is de-asserted after a configured duration and the VR 20 again exits from the turbo mode.

It should be noted that in some embodiments a deglitch filter with configured settings might be used to prevent inefficient or erratic de-assertions of the VR turbo signal 30. For example, in cases where the VR turbo signal 30 would be de-asserted for a very short period of time, such de-assertion may be inefficient, and may therefore be prevented by a deglitch filter. Upon review of this disclosure those skilled in the art can readily appreciate how the present technology may be implemented with deglitching of the VR turbo signal 30.

Figure 3:
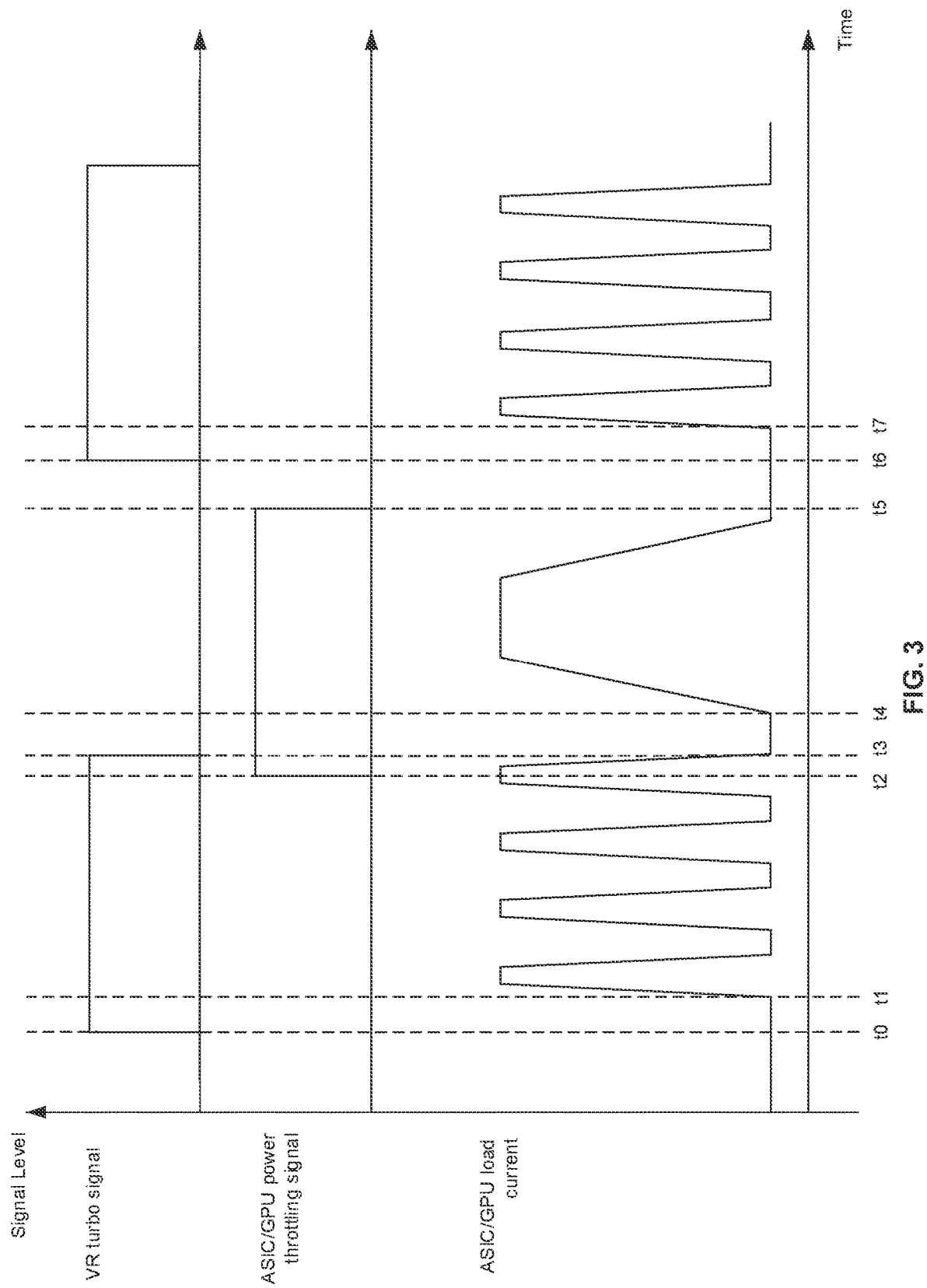
FIG. 3 is a timing diagram showing an illustrative timing relationship between a turbo signal and a power throttling signal, and the current supplied to a processor, in which the power throttling signal is activated for some time.

Regarding the power throttling signal 40, the signal is useful in scenarios involving frequently occurring large load transients. FIG. 3 is a timing diagram showing an illustrative timing relationship between a turbo signal and a power throttling signal 40, and the current supplied to a processor, in which the power throttling signal is activated for some time. The timing diagram is applicable to the processor 10 (e.g., an ASIC/GPU), VR 20 and VR turbo signal 30 of FIG. 1. As shown in FIG. 3, at t0, the ASIC/GPU 10 detects an upcoming large load transient and asserts the VR turbo signal 30. The VR turbo signal 30 stays asserted as the load transient behaves in a periodic way, the VR turbo signal 30 staying asserted for an extended period of time due to, for example, configured VR turbo signal 30 duration being longer than the interval between large load transients, and therefore the VR 20 stays in turbo mode for an extended period of time. This extended turbo mode operation may pose challenges/risks for the VR 20, e.g., thermal runaway. Thus, a warning detection system is implemented in the VR 20, and the VR 20 can assert the power throttling signal 40. The power throttling signal 40 may be routed to the ASIC/GPU 10 signal upon detecting pre-defined failure or warning scenarios in VR 20 or upon detecting that the performance of VR 20 is likely to degrade. As an illustration, at t2 in FIG. 3, the power throttling signal 40 is asserted by the VR 20 and then the ASIC/GPU 10 will throttle itself accordingly. As a result, starting from t4, the load transient is much reduced, and this reduced load transient has been detected and the VR turbo signal 30 is de-asserted at t3. At t5, the VR 20 determines that it is no longer at risk and de-asserts the power throttling signal 40. Thus, the ASIC/GPU asserts the VR turbo signal 30 at t6 in preparation for the load transient to occur at t7.

It should be noted that in some embodiments the power throttling of the ASIC/GPU 10 is configured, so that any transient that occurs during ASIC/GPU power throttling will not be detected as a large load transient that will cause the VR turbo signal 30 to be asserted. In this manner, it is assured that the VR 20 will not operate in turbo mode when the power throttling signal 40 is asserted.

It should be further noted that the delay between power throttling signal 40 and actual throttling action in the ASIC/GPU 10 should be configured so that the delay time is larger than the time between the de-assertion of the VR turbo signal 30 and the start of a large load transient causing assertion of the VR turbo signal 30. If such were not the case, a situation may arise in which the VR turbo signal 30 is asserted for a large load transient that will not occur.

It should also be noted that de-assertion of the VR turbo signal 30 may be filtered by a deglitch filter to prevent the VR turbo signal 30 from being de-asserted for very short periods of time.

Having provided description about how the disclosed technology manages VR response time, several techniques for adjusting VR response time are now described.

There are several proposed ways to boost the VR transient response speed in the turbo mode:

Switching frequency turbo: increasing the VR switching frequency is the one way to enhance the transient response capability. The VR switching frequency could be increased to, for example, in the range of two times to ten times the nominal switching frequency, with the nominal switching frequency being the frequency that is optimized for the power conversion efficiency and handling low to medium load transients.

Control loop turbo: VR transient response capability is also limited by the control loop design. To maintain an adequate stability margin, the bandwidth of the control loop is usually limited to ⅕ to ⅓ of the switching frequency (for fixed frequency VR modulation). With switching frequency turbo, the control loop bandwidth can also be boosted in the turbo mode for a further enhanced transient response.

Figure 4:
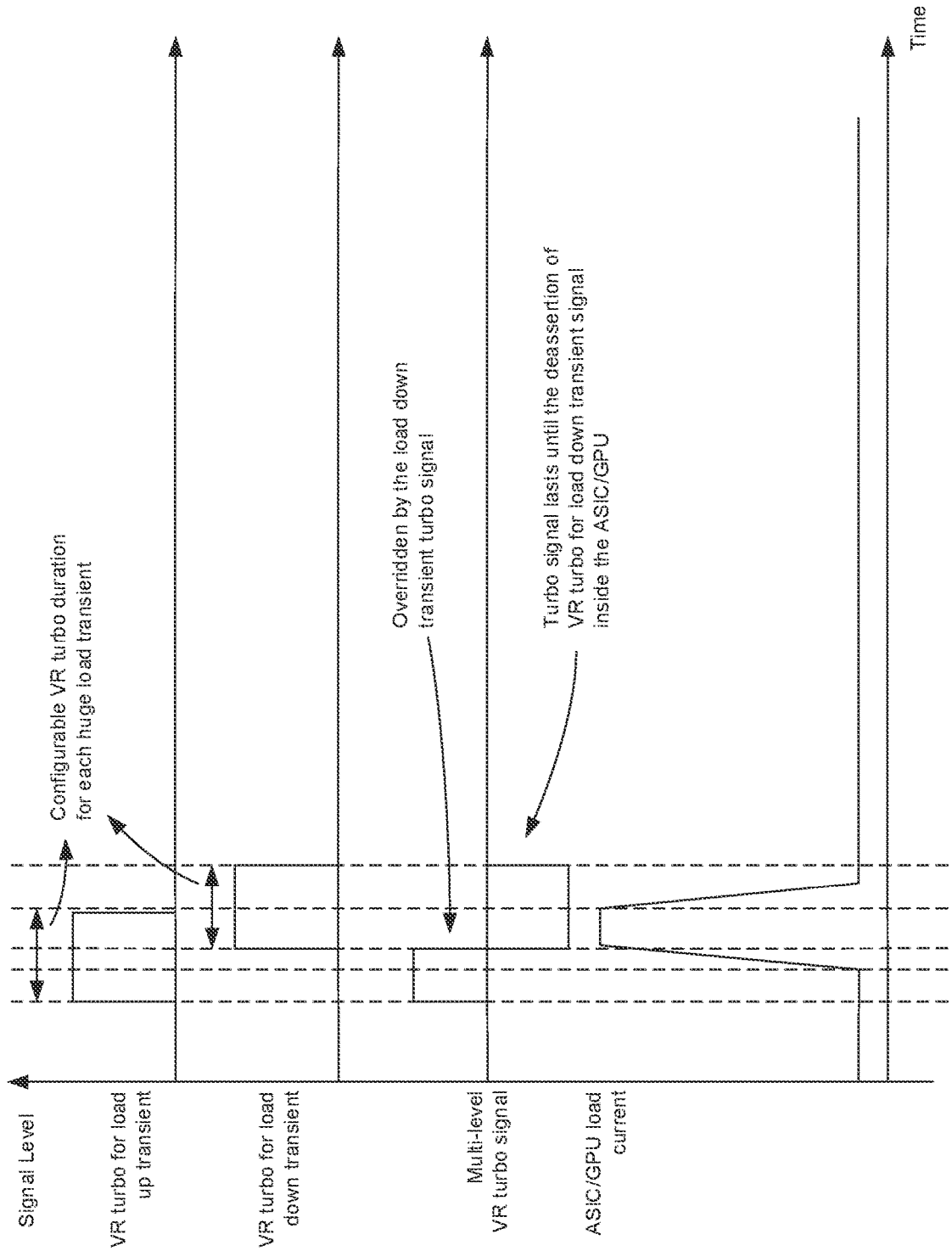
FIG. 4 is a timing diagram showing illustrative timing relationships between various types of turbo signals and the current supplied to a processor.

On-time optimization: for the constant on-time (COT) VR modulation, the transient response is more related to the constant on-time setting (i.e., constant VR switch on-time in all operating conditions, as opposed to the variable VR switch on-time in fixed frequency modulation). For a load step-up transient, increased on-time and reduced blanking time between each phase are needed to burst more energy from VR within a certain period, while for the load step-down transient, decreased on-time is desired to optimize the voltage overshoot. However, this may require an ASIC/GPU to send two signals to the VR: (1) VR turbo for load-up transient; and (2) VR turbo for load-down transient. This can be implemented by 2 turbo signal connections between the ASIC/GPU and VR (e.g., two turbo signals between processor 10 and VR 20). Alternatively, an ASIC/GPU may send a single multi-level logic signal that can be recognized by the VR (e.g., VR turbo signal 30 may be a multi-level logic signal). FIG. 4 is an illustrative timing diagram showing both (1) the timing relationship between a VR turbo up signal, a VR turbo down signal, and an ASIC/GPU load current, and (2) the timing relationship between a multi-level VR turbo signal and the ASIC/GPU load current. The detailed implementation for each design may vary.

Overwriting control loop and/or modulator parameters: including overwriting current references, voltage references, on/off status of power stages to direct VR towards desired operating points.

Output voltage setpoint update: to minimize the voltage window during transients, it is also possible to change the VR output voltage setpoint so that the voltage is regulated to a higher/lower value during a step up/down transient.

Figure 5:
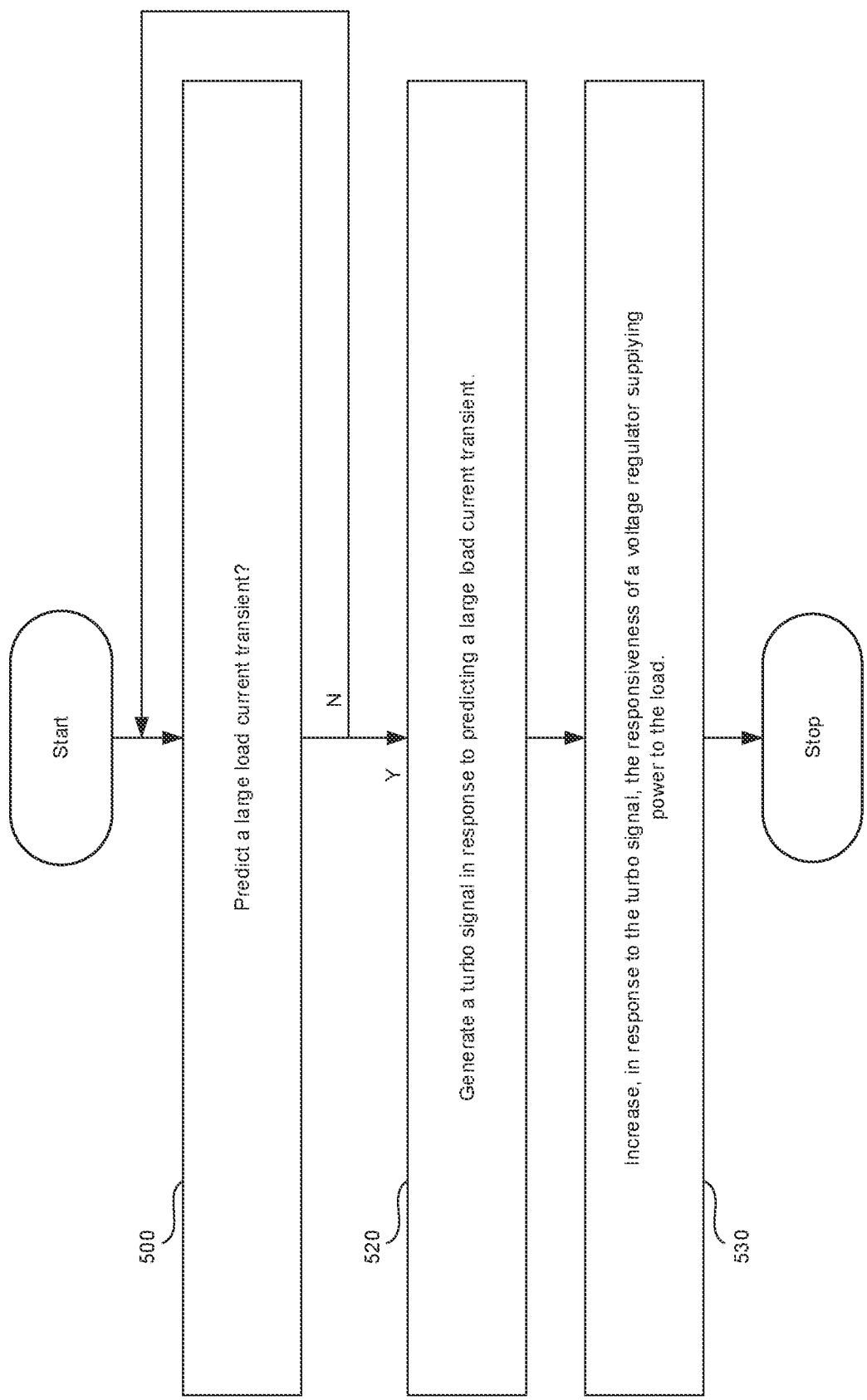
FIG. 5 is a flow chart depicting an illustrative flow of operations for controlling a voltage regulator according to an embodiment.

Referring now to FIG. 5, the figure is a flow chart depicting an illustrative flow of operations for controlling a voltage regulator according to an embodiment. As an initial step, a processor (e.g., an ASIC/GPU) checks to see if it will soon experience a large current transient (step 500). That is, the processor predicts whether there will soon be a rapid increase in the amount of current it will require from a voltage regulator supplying power to the processor, the prediction of a rapid increase being made tens of ns before the rapid increase occurs. If a rapid increase is not predicted, the processor continues to check for upcoming large current transients (step 500). If a large current transient is predicted, the processor generates a turbo signal (e.g., VR turbo signal 30 of FIG. 1) (step 520), and in response to the turbo signal, the responsiveness of the voltage regulator is increased (step 530)

Figure 6A:
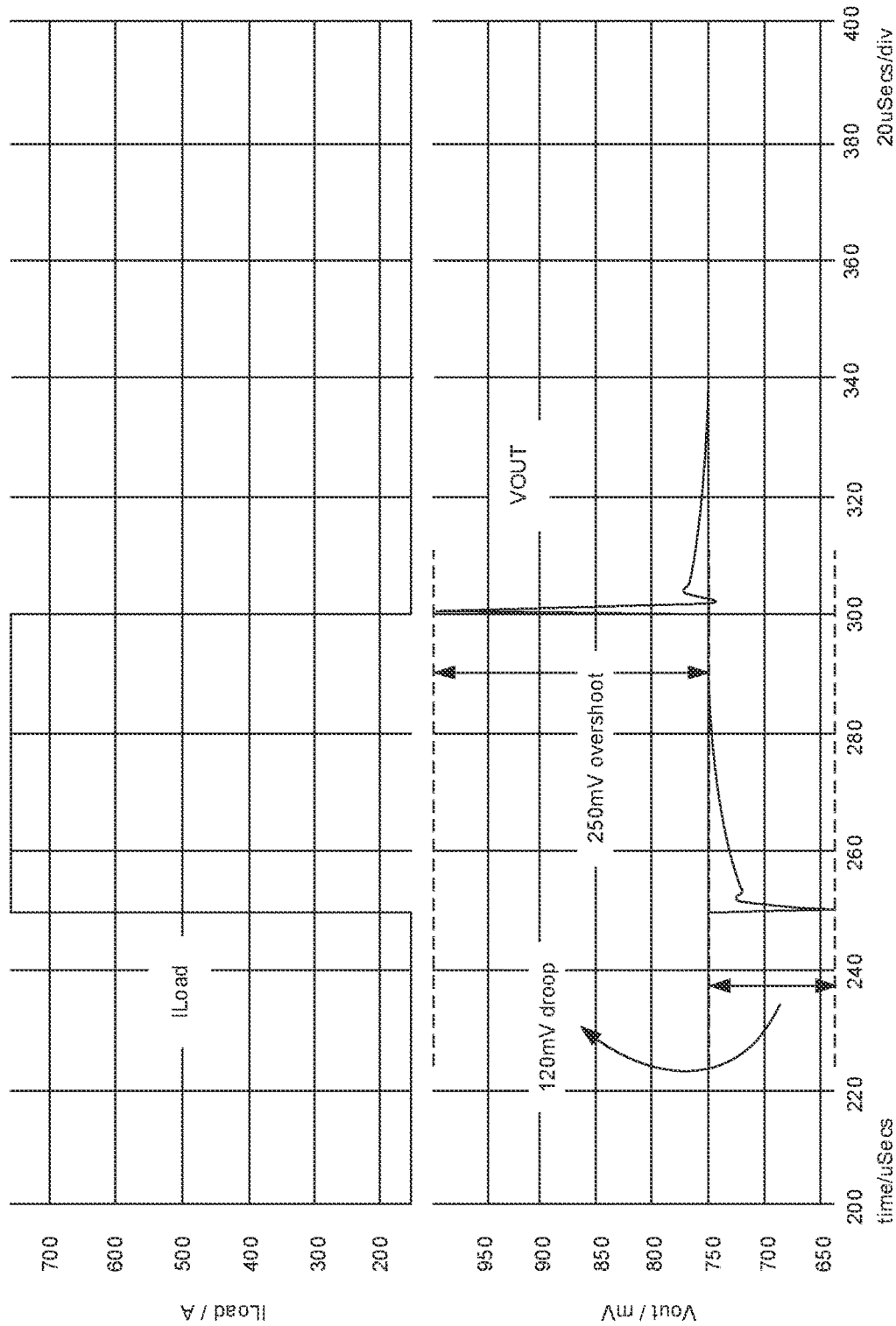
FIG. 6A is a timing diagram showing a relationship between an output voltage of a simulated switching voltage regulator and a load current when the regulator operates at a switching frequency of 500 kHz.
Figure 6B:
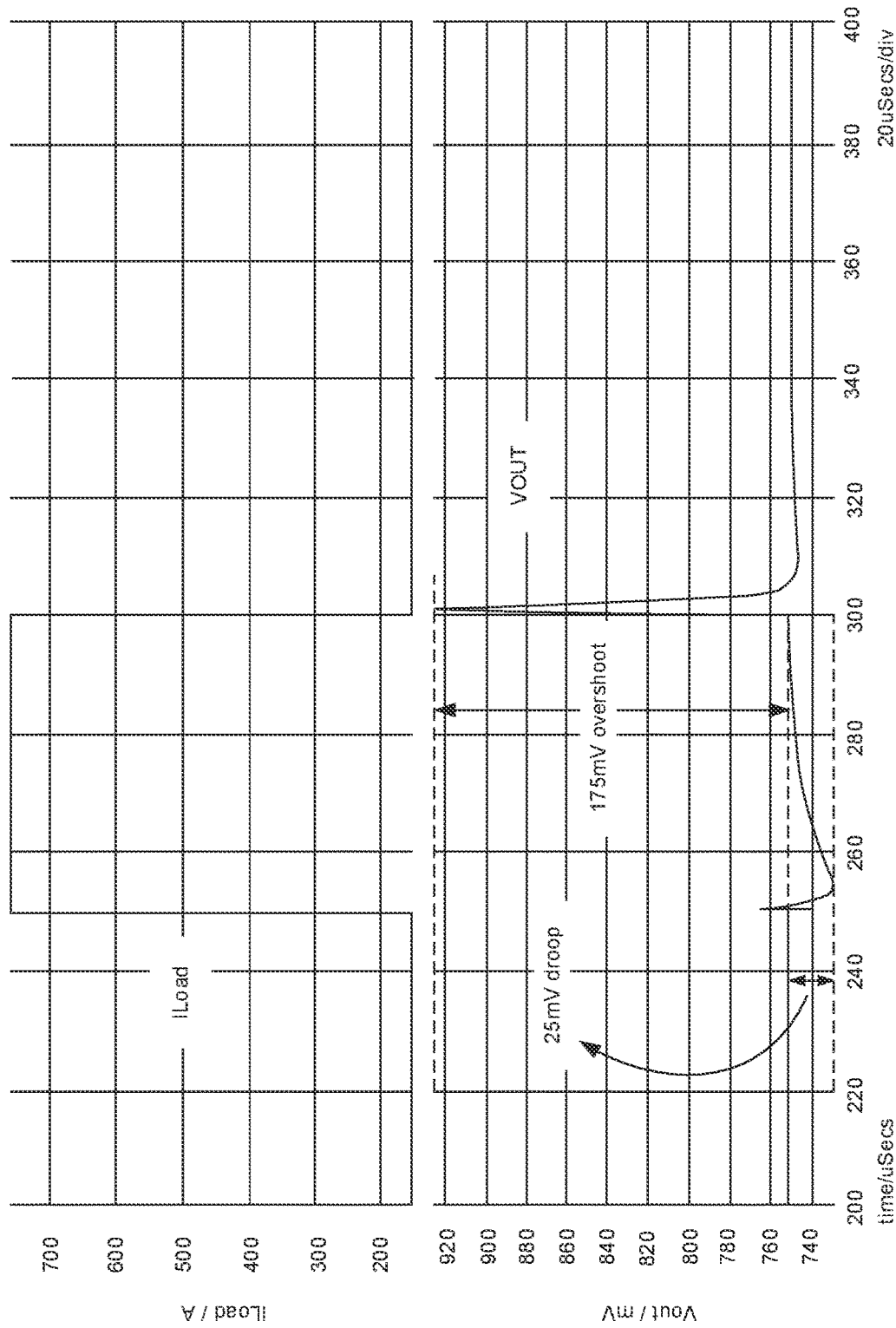
FIG. 6B is a timing diagram showing a relationship between an output voltage of the simulated switching voltage regulator that is the subject of FIG. 6A and a load current when the voltage regulator temporarily operates at a switching frequency of 2 MHz in response to a VR turbo signal from an ASIC/GPU.

To illustrate advantages of the technology in this disclosure, FIGS. 6A and 6B are provided.

FIG. 6A is a timing diagram showing a relationship between an output voltage of a simulated switching voltage regulator and a load current when the regulator operates at a nominal switching frequency of 500 kHz. FIG. 6B is a timing diagram showing a relationship between an output voltage of the simulated switching voltage regulator that is the subject of FIG. 6A and a load current when the voltage regulator operates at a turbo switching frequency of 2 MHz. The simulation configuration for FIGS. 6A and 6B is:

7.5V input voltage to voltage regulator, 0.75V output voltage from voltage regulator the voltage regulator is a 20-phase trans-inductor voltage regulator (TLVR). 500 kHz and 2 Mhz switching frequency for the nominal and turbo mode, respectively 150 A-750 A load transient with a10,000 A/us slew rate a 1 mF decoupling capacitor is applied to the output of the voltage regulator As can be seen from FIGS. 6A and 6B, for the simulation configuration the predictive load transient based VR turbo feature helps to significantly reduce the output voltage droop from 120 mV to 25 mV. The overshoot is also reduced considerably, from 250 mV to 175 mV. It should be noted that in both of FIGS. 6A and 6B, the VR output current slew rate is saturated during the load current step-down event. For VR designs that support higher output current slew rate, the benefit of improved overshoot voltage by employing the predictive load transient based VR turbo feature will be even more significant.

Embodiments of the present technology include, but are not restricted to, the following.

(1) A method for controlling voltage supplied to a load including predicting a large load current transient; generating a turbo signal in response to predicting the large load current transient; and increasing, in response to the turbo signal, responsiveness of a voltage regulator supplying voltage to the load.

(2) The method according to (1), wherein the load is an application-specific integrated circuit (ASIC) or a graphics processing unit (GPU), and wherein predicting the load current transient and generating the turbo signal is performed by the load.

(3) The method according to (1), wherein the voltage regulator is operable as a switching voltage regulator.

(4) The method according to (3), wherein switching of the voltage regulator is controlled according to a constant on time signal, and increasing the responsiveness of the voltage regulator includes increasing a switching frequency of the voltage regulator in response to the turbo signal.

(5) The method according to (3), wherein switching of the voltage regulator is controlled according to a constant on time signal, and increasing the responsiveness of the voltage regulator includes increasing a duration of the constant on time signal in response to the turbo signal.

(6) The method according to (1), wherein the voltage regulator is operable as a low-drop-out (LDO) voltage regulator.

(7) The method according to (1), wherein increasing the responsiveness of the voltage regulator includes increasing a bandwidth of a control loop of the voltage regulator.

(8) The method according to (1), wherein increasing the responsiveness of the voltage regulator includes one or more of changing a control loop parameter of the voltage regulator, changing a modulator parameter of the voltage regulator, changing a current reference of the voltage regulator, changing a voltage reference of the voltage regulator, or changing an on/off status of a power stage of the voltage regulator.

(9) The method according to (1), wherein increasing the responsiveness of the voltage regulator includes changing an output voltage setpoint of the voltage regulator.

(10) The method according to (1), wherein the voltage regulator is operable to generate a power throttling signal upon detecting that a voltage regulator failure occurred or that a voltage regulator performance degradation is likely, and the method further includes reducing load current transients in response to the power throttling signal.

(11) The method according to (1), wherein the load is an ASIC, and the voltage regulator and the ASIC are integral parts of a single unit.

(12) The method according to (1), wherein the load is a GPU, and the voltage regulator and the GPU are integral parts of a single unit.

(13) The method according to (1), wherein the voltage regulator is a trans-inductor voltage regulator (TLVR) or a standard single phase or multiphase magnetic coupled or non-coupled switching regulator.

(14) A processing system including a processor operable to predict a current transient for the current supplying the processor and generate a turbo signal when the current transient is predicted; and a voltage regulator operable to supply voltage to the processor and to increase, in response to the turbo signal, responsiveness of the voltage regulator.

(15) The processing system according to (14), wherein the voltage regulator is operable as a switching voltage regulator

(16) The processing system according to (15), wherein switching of the voltage regulator is controlled according to a constant on time signal, and increasing the responsiveness of the voltage regulator includes increasing a switching frequency of the voltage regulator in response to the turbo signal.

(17) The processing system according to (15), wherein switching of the voltage regulator is controlled according to a constant on time signal, and increasing the responsiveness of the voltage regulator includes increasing a duty cycle of the constant on time signal in response to the turbo signal.

(18) The processing system according to (14), wherein the processor and the voltage regulator are integral parts of a single unit.

(19) The processing system according to (14), wherein the voltage regulator is a trans-inductor voltage regulator (TLVR).

(20) The processing system according to (14), wherein the voltage regulator is operable as a low-drop-out (LDO) voltage regulator.

In accordance with this disclosure, a VR turbo feature may be based on predictive load transient information from an ASIC/GPU, to minimize load voltage undershoot and/or load voltage overshoot caused by large load transient events. The feature may be implemented through use of a VR turbo signal from the ASIC/GPU to the VR, and a power throttling signal from the VR to the ASIC/GPU. When the load current is static or only moderately transient, the VR turbo signal is inactive, and the VR operates in an efficient mode at a nominal switching frequency. Thus, the VR turbo feature effectively decouples the requirement of high conversion efficiency and the requirement of great transient performance for large load transient events.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A method for controlling voltage supplied to a load comprising:
predicting a large load current transient;
generating a turbo signal in response to predicting the large load current transient; and
increasing, in response to the turbo signal, responsiveness of a voltage regulator supplying voltage to the load, and maintaining increased responsiveness of the voltage regulator for a configured duration of the turbo signal such that when a subsequent large load current transient occurs at a time after the large load current transient and before expiration of the configured duration, the increased responsiveness is maintained continuously to the time of the subsequent large load current transient, and such that when the subsequent large load current transient occurs at the time after the large load current transient and after expiration of the configured duration, the increased responsiveness is not maintained continuously to the time of the subsequent large load current transient,
wherein the voltage regulator is operable to generate a power throttling signal upon detecting that a voltage regulator failure occurred or that a voltage regulator performance degradation is likely, and the method further comprises reducing load current transients in response to the power throttling signal, and
wherein a delay between generation of the power throttling signal and actual throttling action is larger than a time between de-assertion the turbo signal and start of a large load current transient.

2. The method according to claim 1, wherein the load is an application-specific integrated circuit (ASIC) or a graphics processing unit (GPU), and wherein predicting the load current transient and generating the turbo signal is performed by the load.

3. The method according to claim 1, wherein the voltage regulator is operable as a switching voltage regulator.

4. The method according to claim 3, wherein switching of the voltage regulator is controlled according to a constant on time signal, and increasing the responsiveness of the voltage regulator comprises increasing a switching frequency of the voltage regulator in response to the turbo signal.

5. The method according to claim 3, wherein switching of the voltage regulator is controlled according to a constant on time signal, and increasing the responsiveness of the voltage regulator comprises increasing a duration of the constant on time signal in response to the turbo signal.

6. The method according to claim 1, wherein the voltage regulator is operable as a low-drop-out (LDO) voltage regulator.

7. The method according to claim 1, wherein increasing the responsiveness of the voltage regulator comprises increasing a bandwidth of a control loop of the voltage regulator.

8. The method according to claim 1, wherein increasing the responsiveness of the voltage regulator comprises one or more of changing a control loop parameter of the voltage regulator, changing a modulator parameter of the voltage regulator, changing a current reference of the voltage regulator, changing a voltage reference of the voltage regulator, or changing an on/off status of a power stage of the voltage regulator.

9. The method according to claim 1, wherein increasing the responsiveness of the voltage regulator comprises changing an output voltage setpoint of the voltage regulator.

10. The method according to claim 1, wherein the load is an ASIC, and the voltage regulator and the ASIC are integral parts of a single unit.

11. The method according to claim 1, wherein the load is a GPU, and the voltage regulator and the GPU are integral parts of a single unit.

12. The method according to claim 1, wherein the voltage regulator is a trans-inductor voltage regulator (TLVR) or a standard single phase or multiphase magnetic coupled or non-coupled switching regulator.

13. A processing system comprising:
a processor operable to predict a current transient for the current supplying the processor and generate a turbo signal when the current transient is predicted; and
a voltage regulator operable to supply voltage to the processor and to increase, in response to the turbo signal, responsiveness of the voltage regulator, and wherein increased responsiveness of the voltage regulator is maintained for a configured duration of the turbo signal such that when a subsequent current transient occurs at a time after the current transient and before expiration of the configured duration, the increased responsiveness is maintained continuously to the time of the subsequent current transient, and such that when the subsequent current transient occurs at the time after the current transient and after expiration of the configured duration, the increased responsiveness is not maintained continuously to the time of the subsequent current transient,
wherein the voltage regulator is operable to generate a power throttling signal upon detecting that a voltage regulator failure occurred or that a voltage regulator performance degradation is likely, and current transients are reduced in response to the power throttling signal, and
wherein a delay between generation of the power throttling signal and actual throttling action is larger than a time between de-assertion the turbo signal and start of a large load current transient.

14. The processing system according to claim 13, wherein the voltage regulator is operable as a switching voltage regulator.

15. The processing system according to claim 14, wherein switching of the voltage regulator is controlled according to a constant on time signal, and increasing the responsiveness of the voltage regulator comprises increasing a switching frequency of the voltage regulator in response to the turbo signal.

16. The processing system according to claim 14, wherein switching of the voltage regulator is controlled according to a constant on time signal, and increasing the responsiveness of the voltage regulator comprises increasing a duty cycle of the constant on time signal in response to the turbo signal.

17. The processing system according to claim 13, wherein the processor and the voltage regulator are integral parts of a single unit.

18. The processing system according to claim 13, wherein the voltage regulator is a trans-inductor voltage regulator (TLVR).

19. The processing system according to claim 13, wherein the voltage regulator is operable as a low-drop-out (LDO) voltage regulator.

* * * * *